United States Patent
Kalchschmidt et al.

(10) Patent No.: US 6,899,370 B2
(45) Date of Patent: May 31, 2005

(54) FIXATION OF A WIPER SYSTEM

(75) Inventors: Peter Kalchschmidt, Bruchsal Untergromb (DE); Marc-Oliver Karle, Stuttgart (DE); Christian Reiser, Ettlingen (DE)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 10/477,692

(22) PCT Filed: Dec. 17, 2002

(86) PCT No.: PCT/DE02/04625
§ 371 (c)(1),
(2), (4) Date: Nov. 14, 2003

(87) PCT Pub. No.: WO03/051689
PCT Pub. Date: Jun. 26, 2003

(65) Prior Publication Data
US 2004/0140687 A1 Jul. 22, 2004

(30) Foreign Application Priority Data
Dec. 17, 2001 (DE) ........................ 101 61 976

(51) Int. Cl.[7] ................................. B60J 1/02
(52) U.S. Cl. .............. 296/96.15; 296/96.17; 15/250.31
(58) Field of Search .......... 296/96.15, 96.17, 296/192, 29, 1.03; 15/250.3, 250.01, 250.44, 250.46, 250.04, 250.32, 250.31, 250.22, 250.27, 250.28, 250.29; 403/371

(56) References Cited

U.S. PATENT DOCUMENTS

| | | | | |
|---|---|---|---|---|
| 3,787,103 A | * | 1/1974 | MacMillan | 384/125 |
| 4,370,774 A | * | 2/1983 | Bienert et al. | 15/250.203 |
| 5,567,097 A | * | 10/1996 | Morin | 411/34 |
| 5,609,329 A | * | 3/1997 | Scholl | 267/141 |
| 5,683,215 A | * | 11/1997 | Gaignard et al. | 411/34 |
| 6,059,294 A | * | 5/2000 | Gorce | 15/250.34 |
| 6,237,185 B1 | * | 5/2001 | Goto et al. | 296/96.17 |
| 6,254,167 B1 | | 7/2001 | Goto et al. | |
| 6,317,918 B1 | * | 11/2001 | Kagawa et al. | 15/250.31 |
| 6,505,376 B1 | * | 1/2003 | Kagawa | 296/96.15 |
| 6,550,097 B1 | * | 4/2003 | Zimmer | 15/250.34 |
| 6,554,477 B1 | * | 4/2003 | Zimmer | 15/250.31 |
| 6,594,853 B1 | * | 7/2003 | Igarashi | 15/250.31 |
| 6,701,569 B1 | * | 3/2004 | Benner | 296/96.15 |
| 6,742,827 B1 | * | 6/2004 | Buchanan, Jr. | 296/96.15 |
| 6,799,482 B2 | * | 10/2004 | Knauf et al. | 296/96.17 |
| 2003/0052504 A1 | * | 3/2003 | Knauf et al. | 296/96.15 |
| 2003/0106179 A1 | * | 6/2003 | Kashiwagi et al. | 296/96.15 |
| 2004/0140687 A1 | * | 7/2004 | Kalchschmidt et al. | 296/96.17 |

FOREIGN PATENT DOCUMENTS

DE 197 37 070 3/1999

* cited by examiner

Primary Examiner—Kiran B. Patel
(74) Attorney, Agent, or Firm—Michael Best & Friedrich LLP

(57) ABSTRACT

The invention starts with a fastening of a wiper system (10) to a vehicle body (20) by means of a rubber elastic fastening element (22), which sits on the circumference in a receptacle opening (26) of the wiper system (10) or the vehicle body (20) and sits with a passage opening (28) on a pin (32) of the respective other part, whereby the connection between the wiper system (10) and the vehicle body (20) is detachable via a defined axial force (30) in the direction of the interior of the vehicle body (20). It is proposed that a defined frictional force between the inner and/or outer circumferential surface (36, 38) of the fastening element (22) and the adjacent component (10, 20, 32) is generated by an initial axial stress of the fastening element (22).

12 Claims, 5 Drawing Sheets

FIXATION OF A WIPER SYSTEM

STATE OF THE ART

Figure 1:
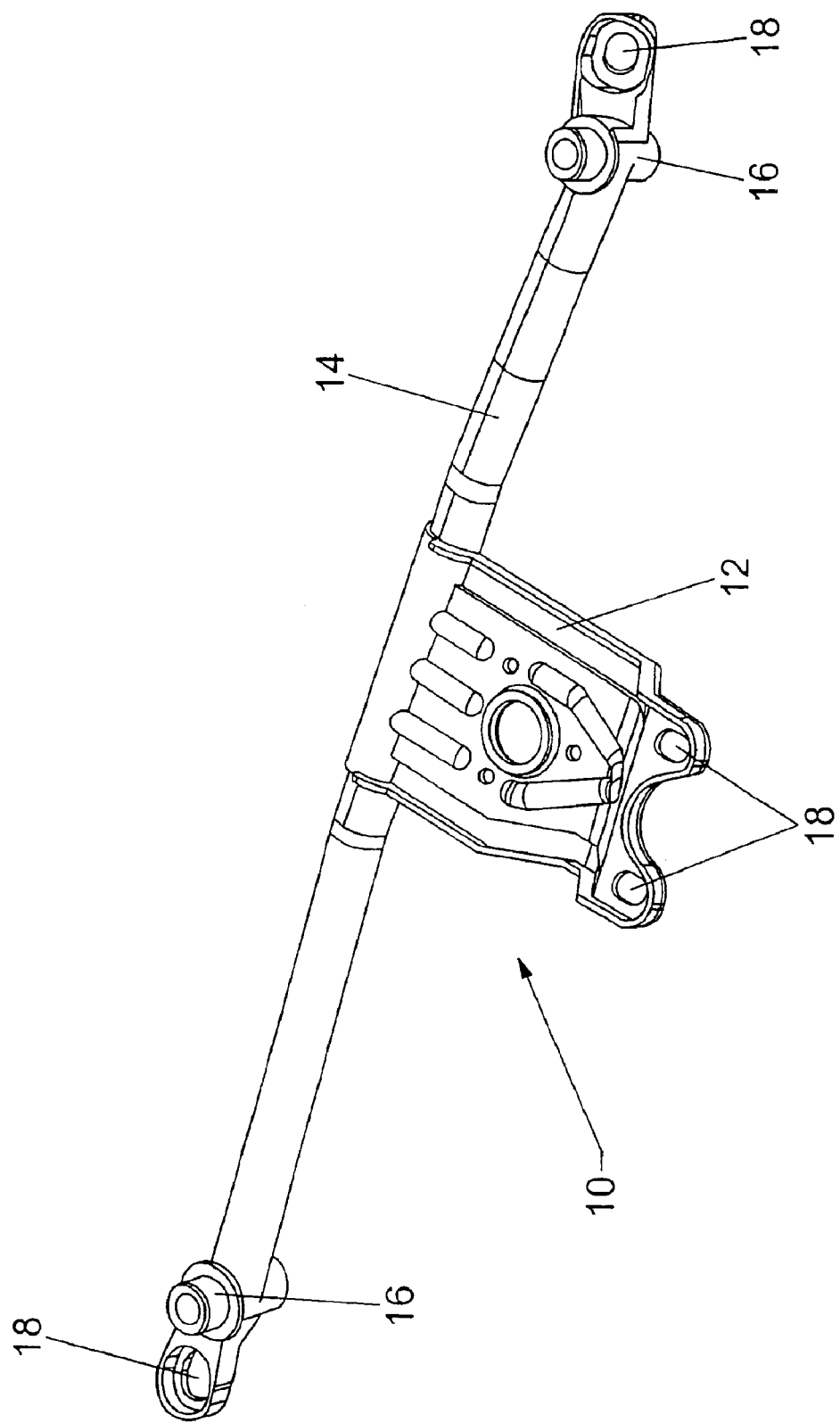

The invention starts from a fastening of a wiper system in accordance with the pre-characterizing clause of claim 1.

Wiper systems for motor vehicles are fastened to the vehicle body of a motor vehicle with a wiper support, a so-called mounting plate or a tubular mounting plate (if the wiper support contains elements of a tube). The mounting plate includes a motor mounting plate, which carries a wiper drive with a wiper motor and a gear built on it. Drive shafts of the windshield wiper are stored in wiper bearings, whose bearing housing is fastened to or formed on the ends of the mounting plate. The mounting plate is fastened to a vehicle body by screws via fastening eyes, which are formed on the bearing housing, on the mounting plate and/or the motor mounting plate.

The end of the drive shaft projecting out of the vehicle body represents a considerable source of danger of injuries in the case of accidents with pedestrians. With respect to accidents with pedestrians, drafts of crash regulations from the European Commission (EC III/5021/96 EN) define maximum acceleration values, so-called head injury criteria, in the area of the vehicle hood at the wiper system. These criteria cannot be met with standard wiper systems even if the vehicle hood covers the drive shaft, since even in this case there is no guarantee that the distance between the vehicle hood and the drive shaft is large enough, particularly in the case of small hood gaps.

One possibility for remedying this consists of the end of the drive shaft giving way with an axial impact stress and being pushed axially in its bearing into the engine compartment. A fastening of a wiper system is known from EP 1 040 972 A2 in which the bearing housing of the drive shaft is connected to the vehicle body via an elastic element and can be detached from the holder with an impact stress. The elastic element is held positively engaged in a bearing eye next to the bearing housing via a ring groove. It is made of plastic with a Shore hardness of 60 to 70 and has a conical opening, which sits on a pin having a correspondingly conical circumference that is fastened to the vehicle body. In addition, the pin has a ring groove that has groove flanks that are inclined towards the pin's longitudinal axis. The elastic element engages positively in the groove with a corresponding projection. In the case of an axial impact stress, the projection slides out of the ring groove and the elastic element is pushed away from the pin so that the wiper system recedes into the vehicle body until it pushes against another part.

In one embodiment the elastic element is arranged directly on an opening in the body panel and is connected to this with positive engagement. The pin sits fixed on the bearing housing as a hollow pin. In the case of an axial impact stress in the area of the drive shaft of the windshield wiper, the pin is pressed out of the elastic element, whereby the elastic element is compressed under the absorption of energy so that the bearing housing can recede until the windshield wiper is adjacent to the body panel. In both embodiments, the force required for detachment can be varied by the geometric design of the pin and by the elastic material used.

A fastening for a tubular mounting plate is known from DE 198 33 158 A1. According to this, a rubber elastic decoupling element is adapted to the inner contour of the mounting plate tube in the area of the fastening borehole. It projects through openings in the fastening borehole with a projection and on the inside overlaps the opening in the axial direction on both sides. The decoupling element is secured in the axial and radial directions by positive engagement due to the projection and the overlap. A spacer bush is used in the decoupling element to limit the tension force of the fastening screws on the decoupling element. The spacer bush comes to bear on the face according to a predetermined tension path and transmits the screw forces as far as they exceed the desired initial stress.

ADVANTAGES OF THE INVENTION

According to the invention, a defined frictional force between the inner and/or outer circumferential surface of the fastening element and the adjacent component is generated by an initial axial stress of the fastening element. The frictional force is defined in such a way that the mounting plate of a wiper system, which forms the adjacent component, for example, is securely fastened on the vehicle body during normal operation. The connection between the vehicle body and the mounting plate will only be detached when, in the case of an impact, the wiper system is stressed by an axially acting force that exceeds the defined frictional force. The wiper system is displaced in the direction of the interior of the vehicle body in accordance with the requirement for a lower risk of injury for persons outside the motor vehicle. The frictional force and thus the force acting against the impact can be determined very precisely by the extent of the initial stress.

Proven principles are used to fasten the wiper system so that the fastening points on the wiper system and the vehicle body can remain as they are and no new construction is required. The rubber elastic and vibration-dampening fastening element sits with its outer circumference in a receptacle opening, which as a rule is formed by a fastening eye on the mounting plate. It has a central passage opening, which sits on a fastening pin. This fastening pin is solidly connected to the vehicle body. However, solutions are also possible where the receptacle opening of the vehicle body and the pin are assigned to the wiper system. The fastening element is compressed axially during assembly, whereby its diameter enlarges and it is supported on the receptacle opening or on the pin. The initial stress generates defined frictional forces on the contact surfaces, which fix the wiper system on the vehicle body until an axially acting force that exceeds the frictional force occurs. The extent of the frictional force depends essentially on the initial stress path, the material properties of the fastening element, its geometric design, its volume, and the relationship between the enclosed surface, the so-called loss surface, and the free surface.

According to an embodiment of the invention, with influencing factors that are otherwise the same, the frictional force can be coordinated via the initial stress path, which is delimited by limit stops, e.g., a distance sleeve. In addition, the surfaces in contact with each other between the fastening element, the fastening eye, and the pin can run cylindrically or conically in one direction. In the case of a cylindrical design, the initial stress generates a pressure force without an axial force component, while, in the case of a conical formation of the surfaces, depending upon the direction of the cone, it generates a force component in the direction of the axially acting holding force or in the opposite direction thereby increasing or lowering the axial force that is required to detach the fastening. The positively engaged connection achieved by the frictional force can also be supported by a positive engagement, e.g., in the form of various holding protuberances on the fastening element or on the pin or fastening eye, which engage in corresponding recesses of the respective other adjacent part.

In one embodiment of the invention, the fastening element is arranged on the end of a fastening pin that is attached to the vehicle body and features a ring groove in the center area. It is supported in the direction of the axial force with the groove base on a bearing surface, which is formed by the cylindrical receptacle opening of the mounting plate. Since the diameter of the bearing surface is smaller than the inside diameter of the ring groove, a frictional force exists between the fastening element and the mounting plate in this area. The frictional force is also defined via the volume and the coefficient of friction of the fastening element as well as a central sleeve, which limits the initial axial stress of the fastening element.

According to one embodiment of the invention, a contact disk is arranged beneath the fastening element. It can be used to vary the free surface of the fastening element. The contact disk expediently features a predetermined breaking point, which breaks when a permissible axial force is exceeded. The predetermined breaking point advantageously has the same diameter as the fastening pin so that the fastening element can yield axially. This reduces the enclosed surface of the fastening element and the pressure force on the frictional connection, which now also detaches under the effect of the axial force. Since the fastening pin with the fastening element remains in place after the wiper system is detached and therefore projects dangerously upwards, however, this fastening possibility can only be used outside of a possible impact range. If the fastening pin is arranged on the mounting plate and if it slides through the receptacle opening into the interior space of the vehicle body after the effect of an axial force, the fastening element can also be arranged in the impact range.

With another embodiment of the invention, a fastening element is provided with an elastically deformable, hollow center area. With the effect of an axial force, this fastening element first buckles in the center area, before, e.g., the frictional or positively engaged connection detaches. The impact is thereby intercepted more smoothly with a portion of the impact energy being annihilated. In addition, the fastening element advantageously absorbs smaller axial forces without the fastening of the wiper system being detached.

All embodiments of the invention can be mounted simply and therefore cost effectively. In addition, repair of the wiper system after an impact with a pedestrian is simple since the detached components only need to be re-mounted again.

DRAWINGS

Additional advantages are yielded from the following description of the drawings. Exemplary embodiments of the invention are depicted in the drawings. The drawings, the description and the claims contain numerous features in combination. The expert will also observe individual features expediently and combine them into additional, meaningful combinations.

Figure 2:
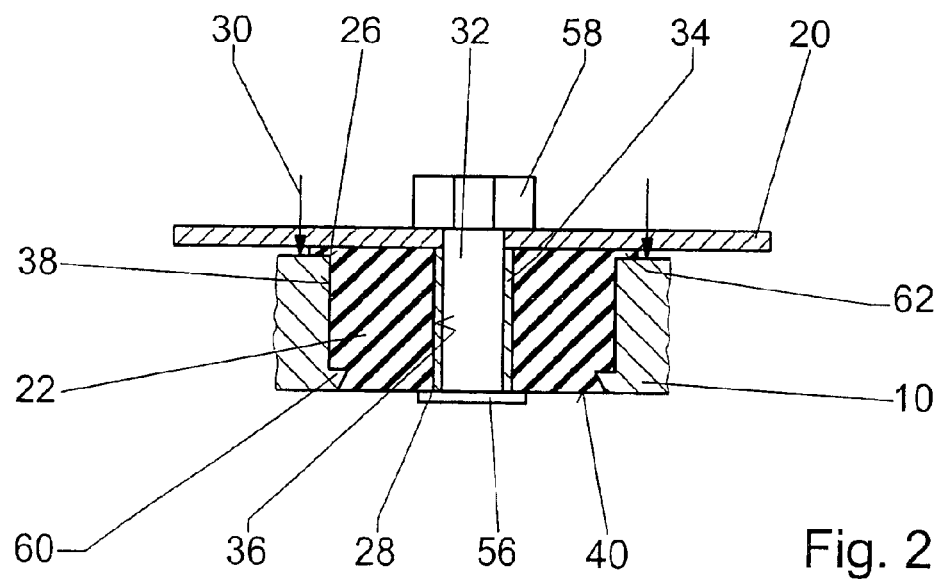
Figure 3:
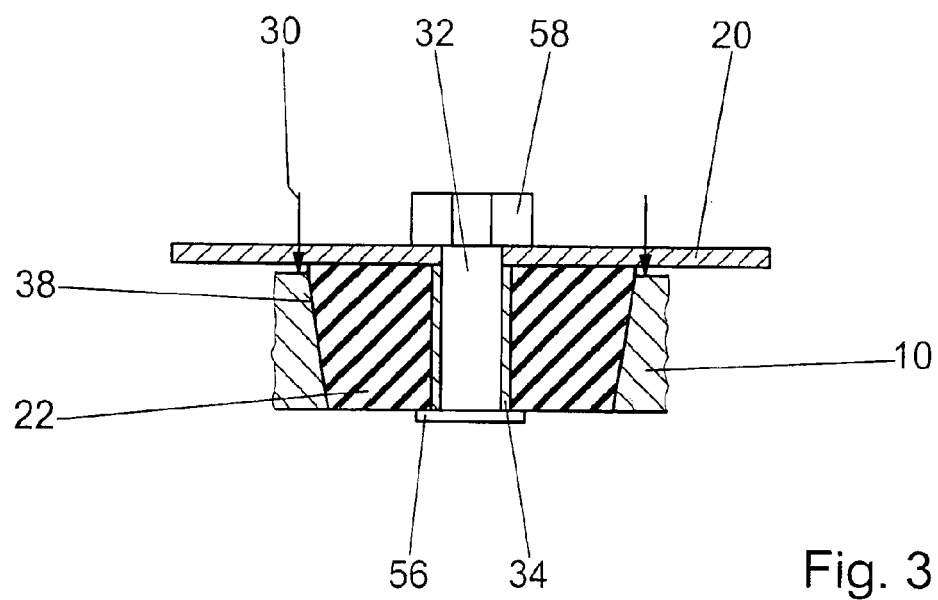
Figure 4:
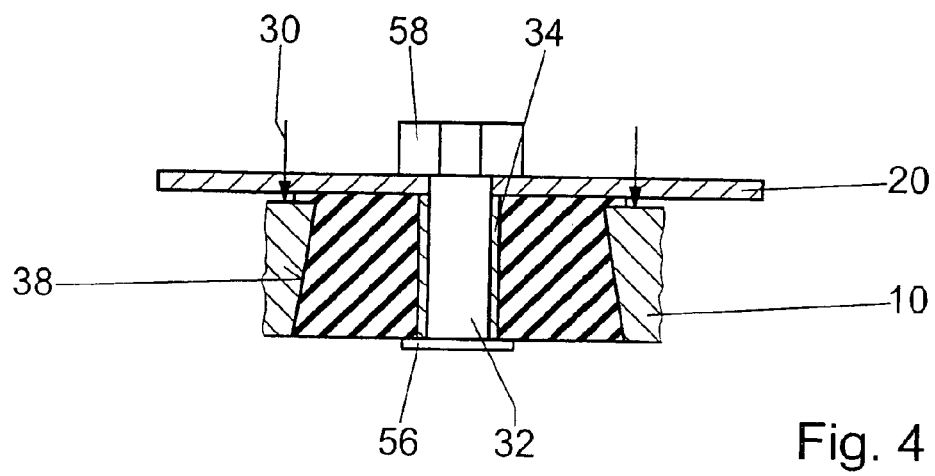
Figure 5:
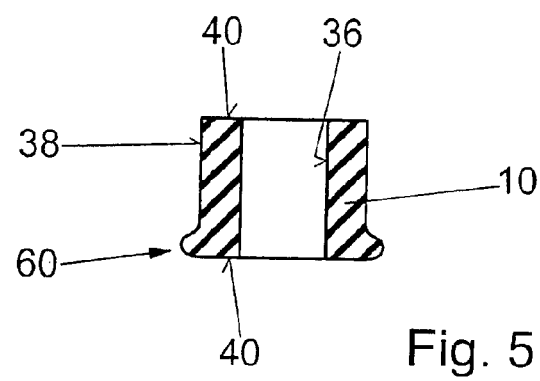
Figure 6:
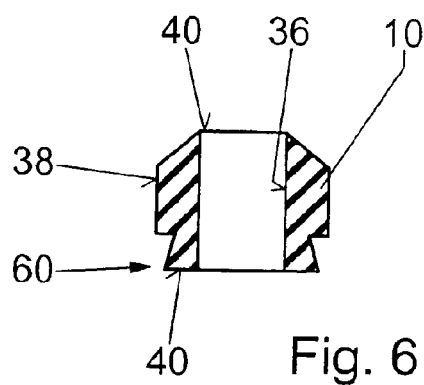
Figure 7:
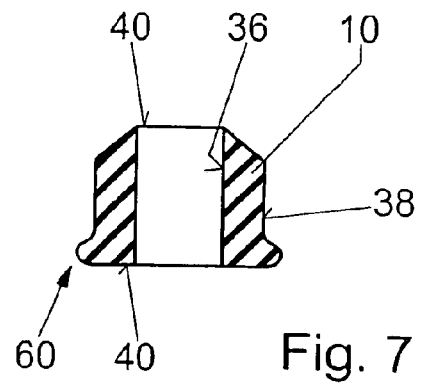

The drawings show:
FIG. 1 A perspective representation of a mounting plate of a wiper system.
FIG. 2 A section through a fastening eye of a wiper system in a mounted state.
FIGS. 3 and 4 Variations of FIG. 2.
FIGS. 5–7 Variations of a fastening element.
FIGS. 8–11 Variations of FIG. 2.

DESCRIPTION OF THE EXEMPLARY EMBODIMENTS

A mounting plate 10 of a wiper system is comprised of a motor mounting plate 12 and a mounting plate tube 14 (FIG. 1). While the motor mounting plate 12 bears a wiper drive (not shown), wiper bearings 16 are arranged on the ends of the mounting plate tube 14. The mounting plate 10 is fastened to a vehicle body 20 via fastening eyes 18, which are formed on the housings of the wiper bearings 16 and on the motor mounting plate 12. The fastening eye 18 has a receptacle opening 26 for a rubber elastic fastening element 22, which simultaneously acts to dampen vibration between the mounting plate 10 and the vehicle body 20 (FIG. 2).

The fastening element 22 features a central passage opening 28 for a fastening pin 32. This pin supports itself on one end with a formed collar 56 on a fore part 40 of the fastening element 22, while the other end is screwed onto the vehicle body 20 with the aid of screw nut 58. A sleeve 34 is arranged between the fastening pin 32 and the fastening element 22 and this sleeve limits the tension forces of the screwed connection when it comes to bear on the face of the vehicle body 20 in accordance with a predetermined tension path.

In an assembled state, the fastening element 22 is compressed and conforms with an inner circumferential surface 36 to the sleeve 34 and with an outer circumferential surface 38 to the contour of the receptacle opening 26 of the mounting plate 10. The circumference of the fastening element 22 enlarges due to initial axial stress so that a pressure force and a frictional force are generated between the contact surfaces, which forces fix the mounting plate 10 on the vehicle body. If an axial force 30 that exceeds the value of the frictional force occurs in the case of an impact, the mounting plate 10 detaches from the fastening element 22.

The frictional force is adjusted via its influencing variables in such a way that persons are not harmed by an accident. In the embodiment according to FIG. 2, the fastening element has an inner 36 and an outer 38 circumferential surface running cylindrically. They are acted on perpendicularly by the pressure forces, which are generated by the initial stress, so that no force components occur in the direction of an axial force. In addition, the receptacle opening 26 has a holding protuberance 60 in the area of a fore part 40, and this protuberance engages in the fastening element 22 thereby forming a positive engagement that supports the frictional force. A formed-on collar 62 of the fastening element 22 serves to isolate front-side vibrations of the mounting plate 10 vis-à-vis the vehicle body 20.

The outer circumferential surface 38 can also run conically, whereby the diameter either increases (FIG. 3) or decreases (FIG. 4) in the direction of the vehicle body 20. An axial force component, which acts against or supports the holding force, is generated by the initial stress in accordance with the angle of the cone. In addition, a holding protuberance 60 with a different design can be formed on, e.g., in a projecting, rounded form (FIG. 5) or an angular recess. In addition, the fastening element 22 can be embodied as a truncated cone in the area of the fore part 40 (FIG. 6, FIG. 7). The shape variations can be combined at will in order to define the frictional forces as precisely as possible in accordance with the requirements and the given space conditions.

Figure 8:
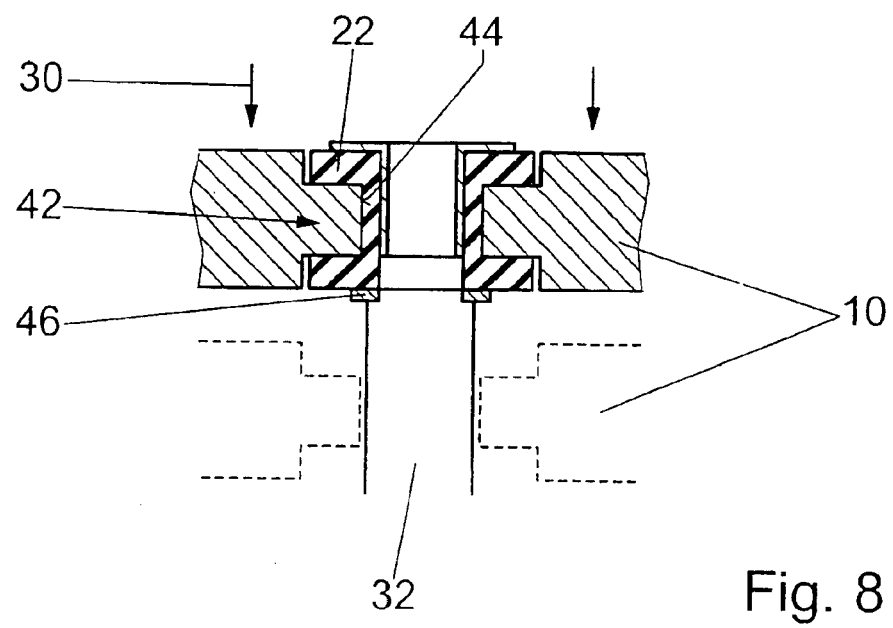

In the embodiment according to FIG. 8, the fastening element 22 features a ring groove 42, which is supported on a bearing surface 44 in the direction of the axial force 30. So that a frictional force is generated between the mounting plate 10 and the fastening element 22, the diameter of the bearing surface 44 is smaller than the inside diameter of the ring groove 42. In this embodiment, besides the coefficient of friction and the volume of the fastening element 22, the extent of the frictional force is determined substantially by the difference in diameter. The fastening element 22 is arranged on the end of the fastening pin 32 and is also supported on a contact disk 46 with a predetermined breaking point. If the axial force 30 exceeds a permissible value, the mounting plate 10 slips out of the ring groove 42. At the same time, the contact disk 46 breaks at the predetermined breaking point and the mounting plate 10 slides along the fastening pin 32 into the interior space of the vehicle body 20. The position of the mounting plate 10 in this state is depicted in FIG. 8 by a dashed line. The fastening pin 32 with the fastening element 22 remains in place and projects upwardly. As a result, it is expediently arranged outside a possible impact range of a person.

Figure 9:
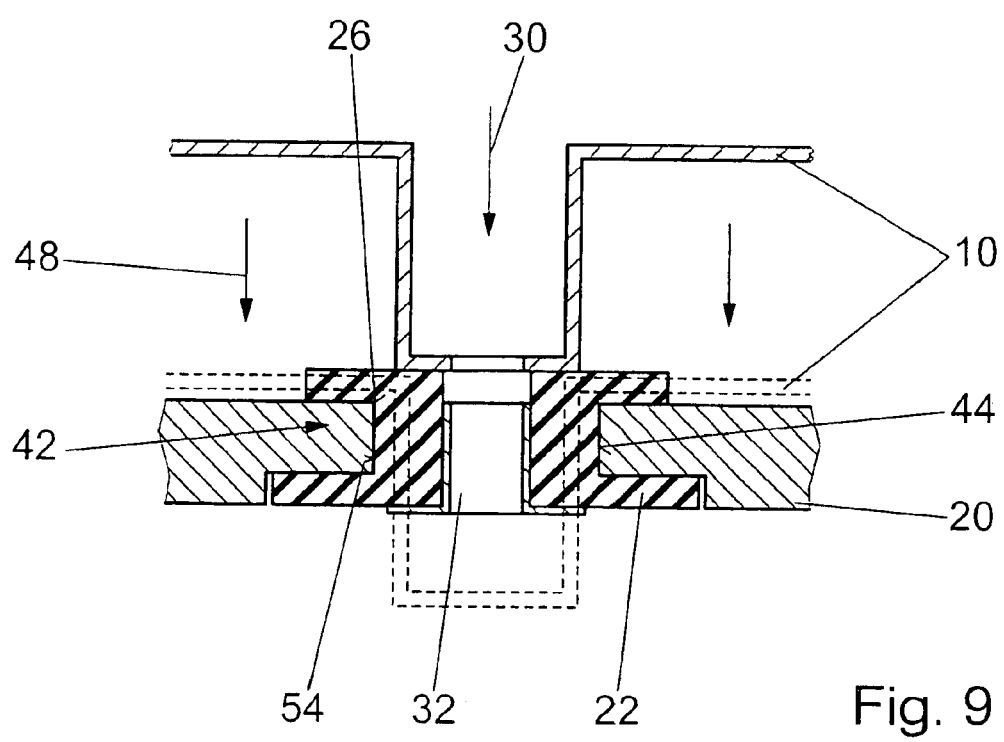

An alternative to this is depicted in FIG. 9. In this case, the fastening pin 32 is fastened to the mounting plate 10 and features a fastening element 22 with a ring groove 42 on the end facing the vehicle body 20. This element is supported with the groove base 54 on the bearing surface 44, which is formed by a cylindrical receptacle opening 26 in the vehicle body 20. If the axial force 30 is greater than the holding force, the body panel 20 detaches from the ring groove 42 and the fastening pin 32 slides in the receptacle opening 26 until adjacent components of the mounting plate 10 meet at the vehicle body 20. In doing so, the mounting plate 10 displaces in direction 48 and assumes the position depicted by the dashed line, whereby the fastening element 22 is pressed out of the receptacle opening.

Figure 10:
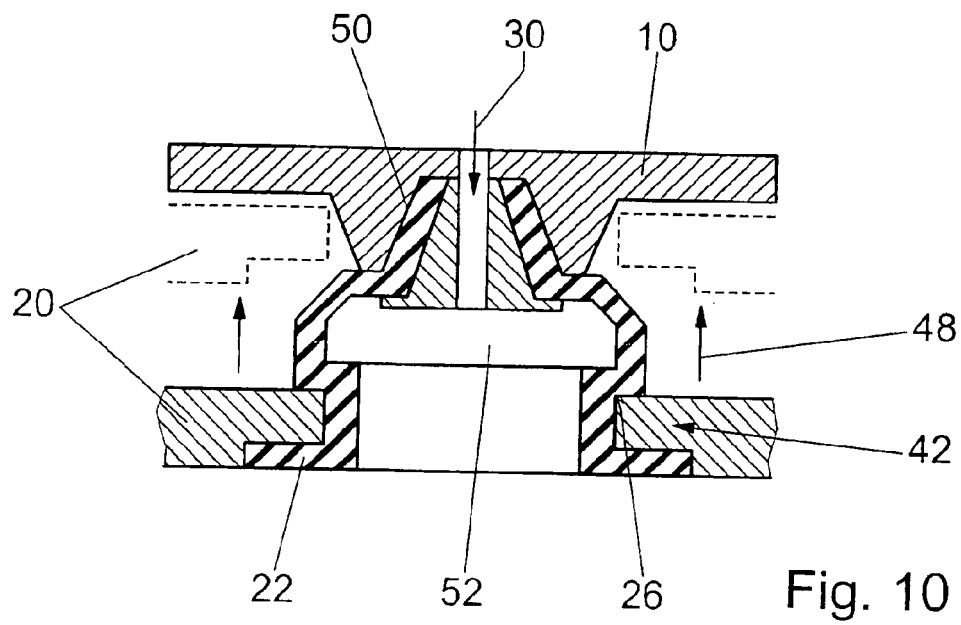
Figure 11:
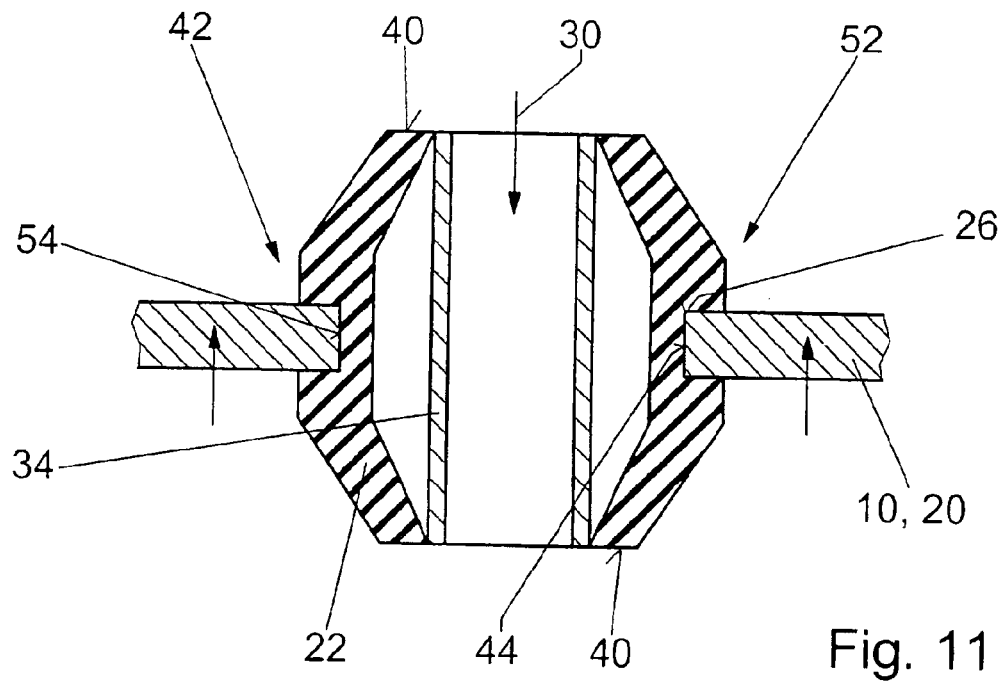

FIG. 10 shows another embodiment according to which the fastening element 22 is connected to the mounting plate 10 at one end by a truncated conical clamp connection 50, while the other end features the ring groove 42 that has already been described. Both ends are connected via a center area 52, which is hollow and elastically deformable. This area absorbs axial forces first of all because of its elasticity. If the axial force 30 continues to increase, it buckles more and more until the fastening element 22 releases from the vehicle body 20 when the axial force 30 reaches a specific value and displaces against direction 48 relative to the vehicle body, which is depicted in the figure by dashed lines.

Another embodiment (FIG. 11) is developed if the center area 52 is combined with a central sleeve 34 and the ring groove 42 is also arranged in the center of the fastening element 22. The fastening element 22 features truncated conical ends in the area of the fore parts 40, which are mounted against each other. Because of the initial axial stress, the center area 52 of the fastening element 22 deflects outwardly, the groove base 54 is pressed against the bearing surface 44 of the receptacle opening 26, and the ends in the area of the fore parts 40 are supported radially on the sleeve 34. After the effect of an axial force 30 of a defined value, the fastening element 22 slides through the receptacle opening 26, which can be formed via the mounting plate 10 or the vehicle body 20.

What is claimed is:

1. Fastening of a wiper system to a vehicle body of a vehicle having an interior, the fastening comprising an elastic fastening element having at least one of an inner circumferential surface and an outer circumferential surface, the elastic fastening element received within a receptacle opening of the wiper system or the vehicle body and having a passage opening within which is received a pin of the vehicle body or the wiper system, respectively, whereby a connection between the wiper system and the vehicle body is detachable via a threshold axial force in a direction toward the interior of the vehicle body, and wherein a defined frictional force between at least one of the inner circumferential surface of the fastening element and the pin and the outer circumferential surface of the fastening element and the vehicle body or wiper system is generated by an axial stress of the fastening element.

2. Fastening according to claim 1, further comprising a stop which limits axial deformation of the fastening element during assembly.

3. Fastening according to claim 2, wherein the stop is formed by a sleeve which surrounds the pin.

4. Fastening according to claim 1, wherein the fastening element has a conical inner or outer circumferential surface and is received in the receptacle opening or on the pin.

5. Fastening according to claim 1, wherein the inner and outer circumferential surfaces essentially run cylindrically.

6. Fastening according to claim 1, wherein, in addition to adhesion, the fastening element is held in the receptacle opening or on the pin by an axially acting positive engagement.

7. Fastening according to claim 1, wherein one end of the fastening element features a truncated conical fore part.

8. Fastening according to claim 6, wherein the fastening element features a ring groove having an inside diameter, and wherein the fastening element is supported in the direction of the axial force on a bearing surface whose diameter is smaller than the inside diameter of the ring groove.

9. Fastening according to claim 1, wherein the fastening element is supported in the direction of the axial force on a contact disk which has a predetermined breaking point in accordance with the threshold axial force.

10. Fastening according to claim 1, wherein the wiper system is fastened to the vehicle body from outside via the pin, and the pin is inserted into the vehicle body responsive to the threshold axial force.

11. Fastening according to claim 1, wherein the fastening element is connected on one end to the wiper system via a truncated conical clamp connection and is connected on another end via an elastically deformable, hollow center area, which is positively engaged in the receptacle opening via a ring groove.

12. Fastening according to claim 1, wherein the fastening element features truncated conical fore parts, a center area, ends, and a ring groove in the center area and having a groove base, whereby the center area deflects outwardly due to the axial stress so that the groove base is pressed against a bearing surface, while the ends are supported on a sleeve in an area of the fore parts.

* * * * *